(12) United States Patent
Nussbaumer

(10) Patent No.: US 6,257,416 B1
(45) Date of Patent: Jul. 10, 2001

(54) FLUID TREATMENT DEVICE WITH TANGENTIAL DUCTS AND METHOD FOR DIMENSIONING THE DEVICE

(75) Inventor: Dietmar Nussbaumer, Göttingen (DE)

(73) Assignee: Sartorius AG (DE)

( * ) Notice: Subject to any disclaimer, the term of this patent is extended or adjusted under 35 U.S.C. 154(b) by 0 days.

(21) Appl. No.: 09/399,639

(22) Filed: Sep. 20, 1999

(51) Int. Cl.[7] .............................. B01D 27/00; B01D 27/08
(52) U.S. Cl. ......................... 210/435; 210/446; 210/456; 210/503; 210/512.1
(58) Field of Search ................................. 210/435, 446, 210/456, 512.1, 503, 505; 434/381; 702/182

(56) References Cited

U.S. PATENT DOCUMENTS 4,248,736  2/1981  Fuchigami et al. .................. 210/502
5,838,587 * 11/1998  Maisotsenko et al. .............. 364/512

\* cited by examiner

Primary Examiner—John Kim
(74) Attorney, Agent, or Firm—Chernoff, Vilhauer, McClung & Stenzel, LLC

(57) ABSTRACT

Devices suitable for adsorptive separation, filtration or catalytic conversion of liquid media are disclosed that have ideal dimensions for efficient performance. A method for dimensioning such devices is also disclosed.

6 Claims, 4 Drawing Sheets

FLUID TREATMENT DEVICE WITH TANGENTIAL DUCTS AND METHOD FOR DIMENSIONING THE DEVICE

The priority of application Ser. No. PCT/EP 98/01426 filed Mar. 12, 1998 is claimed pursuant to 35 USC §120, as well as that of application Ser. No. DE 19711186.6 Mar. 18, 1997 pursuant to 35 USC §§119(a) and 365(b) is claimed.

BACKGROUND OF THE INVENTION

The invention concerns an apparatus for treatment of liquids wherein the liquids flow through a porous web material. The type of porous web material depends on the treatment to which the liquid is to be subjected. The treatment can be a filtration process, for example, to remove particles, an adsorption process wherein specific components are removed from the liquid by adsorption onto the web material, or a catalytic process wherein one or more components of the liquid are subjected to specific chemical or physical conversions by contact with the porous web material.

Appropriate porous web materials include microporous membranes with a pore size range from 0.05 to 15 $\mu$m or nonwoven fibers. When the liquid is to be treated by filtration, suitable web materials include inert microporous membranes made from polymers such as cellulose acetate, regenerated cellulose, polyamides, polysulfone, polyethersulfone, etc., or nonwoven membranes made from polymers such as polyester, polypropylene and cellulose fibers. In the case of adsorption, adsorption membranes are used. Adsorption membranes are membranes that carry functional groups, ligands, or reactants on their inner and/or outer surface that are capable of interacting with at least one substance of a liquid phase that is in contact with them, and the term may be applied to a wide variety of adsorption membranes such as cationic, anionic, ligand, affinity or activated membranes which, in turn, may be classified according to the type of functional groups, ligands, or reactants they possess. Catalytic processes preferably involve enzymatic conversions wherein immobilized enzymes are on the porous web material. Acid- or base-catalyzed conversions, however, are also possible using strongly acid or strongly basic membrane ion exchangers membranes.

The porous web material can be used in either one layer or in several layers. The multilayer version can be formed into a hollow cylinder with an internal and external support element, wherein tangential channels may be in the form of annular gaps or as rectangular mats, the latter being the preferred form for smaller disposables used on a laboratory scale. The tangential channels can also contain a tangentially permeable support structure, consisting of, for example, a woven fabric. Devices using such porous web materials can also have several porous webs and tangential channels, wherein a feed channel in the porous web material and a discharge channel are arranged in alternation. The latter arrangement is preferably implemented so that, for purposes of axial flow, two webs of the web material are wound together with two webs of the support structure around a core, and the support structure forming the discharge channel is connected on the feed side fluid-tight to the adjacent porous webs. The same is then done on the discharge side, with the support structure forming the feed channel.

There are devices known for the treatment of liquids wherein pressurized liquid feeds are fed to a flat, porous web material via a tangential channel closed on the end, passed through this material and then discharged through another tangential channel that has an opening on the other end of the device. The shortcomings of such devices are that they have unnecessarily large dead volumes and the applied operating pressure is only partially utilized for permeation of the web material—a situation that is accompanied by different permeation-active pressure differences over the length of the channel. A large dead volume is a drawback because, among other things, it increases the manufacturing costs of the apparatus. Incomplete utilization of the operating pressure leads to inefficiency, while locally different permeation-active pressure differences tend to lead to more rapid blinding in most applications in the range of higher pressure differentials, and to nonuniform target substance breakthrough or nonuniform substance conversion during adsorption and catalysis, respectively.

The primary goal of the present invention is therefore to provide an apparatus for the treatment of liquids of the type mentioned that avoids excessive dead volume, and wherein the employed operating pressure is utilized as completely as possible for permeation of the liquids through the porous web material.

BRIEF SUMMARY OF THE INVENTION

The foregoing objective is solved by adjusting the hydraulic permeability of the tangential channels of the fluid treatment device to the hydraulic permeability of the porous web material, so that during operation an essentially constant pressure difference prevails over the entire length of the channel between the feed and permeate channels. It was surprisingly found that such tangential channels can be dimensioned for a specific application without a costly, empirical optimization process. More specifically, it has been found that the intricate hydrodynamic conditions of such fluid treatment devices can be treated mathematically with sufficient accuracy based on certain simplifying assumptions, and that relevant parameters can be dimensioned according to a set of relationships, which essentially involves linking hyperbolic functions, with a single dimensionless quantity serving as a variable, as explained in greater detail below.

DETAILED DESCRIPTION OF PREFERRED EMBODIMENTS

As mentioned above, the impetus for the present invention was the discovery that certain assumptions could be made concerning the operation of fluid treatment devices, those assumptions greatly simplifying from a theoretical standpoint the otherwise complex operation of such devices. The simplifying assumptions are:

the flowing amount of liquid—both in the channels and in the porous web material—is linearly dependent on the locally active pressure differential;

tangential flows in the porous web material are negligible; and the feed and permeate channels are hydraulically identical, i.e., they have the same resistance and volume.

Figure 2:
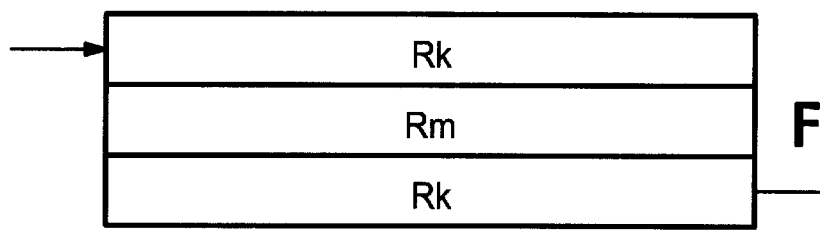
FIG. 2 is a schematic depicting the relationship between hydraulic resistances in the feed and permeate channels and porous web material therebetween.
Figure 4:
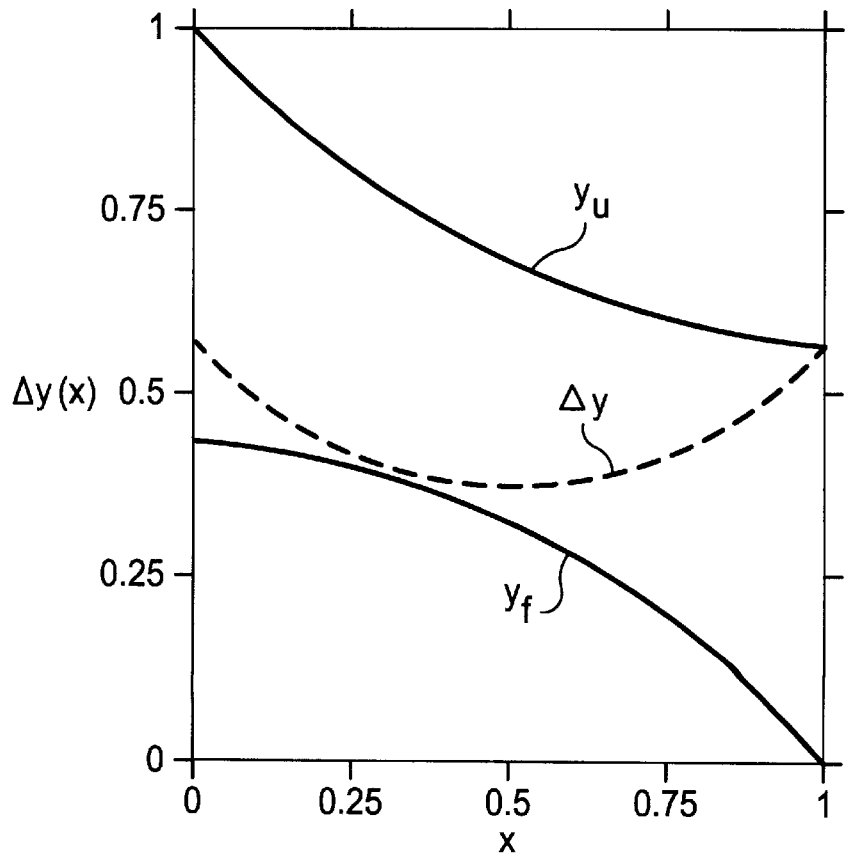
FIG. 4 is a graph of the pressure parameters $y_u$ in the feed channel and $y_f$ in the permeate channel and of the dimensionless local pressure differenyce $\Delta y$, as a function of the local parameter x, when A=1.

The first-mentioned assumption is based upon a hypothesis that hydraulic flow in fluid treatment devices of the present invention roughly obey the laws of thermodynamics and that the laws of thermodynamics are known to be analogous to the laws of physics pertaining to electrical circuitry, a well-known tenet of which is that the flow of electricity is inversely proportional to resistance. This is schematically depicted in FIG. 2, wherein $R_k$ represents the hydraulic resistance of a feed or permeate channel and $R_m$, represents the hydraulic resistance of the microporous web material between the feed and permeate channels.

The following definitions apply:

$R_k$ is measured in bar•min/cm$^3$ and is defined by the equation $$R_k = \Delta P_k b_k / QS,$$

$R_m$ is measured in bar•min/cm and is defined by the equation $$R_m = \Delta P_m b_k S / Q \text{ wherein } \Delta P = P_u(s) - P_f(s);$$

and wherein
Q=local fluid flow in cm$^3$/min;
$b_k$=channel width in cm;
s=actual distance fluid has travelled in channel in cm;
$P_u$=local pressure in the feed channel in bar;
$P_f$=local pressure in the permeate channel in bar;
$P_o$=input pressure in bar; and
L=channel length in cm;

The hydraulic channel resistance $R_k$ of a support structure can be determined experimentally by means of the above relationships, wherein a sample of width $b_k$ and length s sealed between two plates and on the edges is tangentially traversed with a liquid having a viscosity of one cP.

Reduction of the amount of liquid in the permeate channel is given by the equation $$\frac{d}{ds}Q = \frac{P_u - P_f}{R_m} \cdot b_k$$

wherefrom the differential equation $$\frac{d^2}{ds^2}P_u = \frac{P_u - P_f}{R_m} \cdot R_k$$

is obtained.

The following four dimensionless parameters $y_u$, $y_f$, x and A are then introduced:

feed channel pressure parameter $y_u$ wherein $$y_u = P_u / P_o;$$

permeate channel pressure parameter $y_f$ wherein $$y_f = P_f / P_o;$$

local variation parameter x wherein $$x = s/L;$$

and
resistance parameter A wherein $$A = L \cdot \sqrt{\frac{R_k}{2 \cdot R_m}}$$

Substituting the above dimensionless parameters, the dimensionless form of the above differential equation thus becomes $$\frac{d^2}{dx^2} y_u = 2 \cdot A^2 \cdot (y_u - y_f)$$

wherein the following boundary conditions apply:
input pressure $y_u(0)=1$;
free outflow $y_f(1)=0$;
no flow at beginning of filtrate channel $[(d/dx)y_f(0)=0]$; and
no flow at end of permeate channel $[(d/dx)y_u(1)=0]$.

After solution of the differential equation and comparison of the coefficients and taking into consideration the above boundary conditions, there are obtained the following hyperbolic function relationships:

for the local pressure parameters $y_u(A,x)$ and $y_f(A,x)$ in the feed and permeate channels, those parameters are calculated by the expression:

$$\frac{\cosh(A) + 2 \cdot A \cdot (1-x)\sinh(A) + \cosh(A \cdot (1 - 2 \cdot x))}{2 \cdot (\cosh(A) + A \cdot \sinh(A))}$$

based on the assumption that the feed and permeate channels are hydraulically identical, with the same resistance and volume.

in the general case the dimensionless local pressure difference $\Delta y$ is given by:

$$\Delta y(A, x) = \frac{\cosh[A(1-2x)]}{\cosh A + A \sinh A} \neq 0$$

Upon integration of the dimensionless local pressure difference over the channel length for the average dimensionless pressure difference $\Delta y_m$ $$\Delta y_m(A) = \sin hA/A(\cos hA + A \sin hA)$$

the relative local pressure difference $\Delta y_{rel}$ is defined as $$\Delta y_{rel}(A,x) = \Delta y(A,x)/\Delta y_m(A)$$

$$\Delta y_{rel}(A,x) = A \cos h[A(1-2x)]/\sin hA$$

During material separation by adsorptions breakthrough of the target substance begins at the sites of maximum pressure difference, i.e., at the beginning and end of the channel, and ends at the site of minimal pressure difference, i.e., in the center of the channel. In accordance with the present invention, it has been demonstrated that beginning breakthrough $v_b$ and the end of breakthrough $v_e$, expressed in parts or multiples of the volume at which breakthrough would occur with uniform pressure distribution, exhibit the following dependences on the dimensionless resistance parameter A:

$$v_b(A) = \tan hA/A; \quad v_e(A) = \sin hA/A.$$

When a channel with a certain value of $R_k$ in the same porous web material is increased by a certain value $R_m$, the permeation performance at a given input pressure rises as a result of the increased surface area. However, this is only possible up to a certain limit, as follows directly from the consideration that the permeation performance must be zero at infinite length of the channel. In accordance with the present invention, it has been demonstrated that the dimensionless resistance parameter A at maximum permeation performance $A_{max}$ of the channel has a specific value:

$$A_{max} = a \cot h \cdot \sqrt{2} = 0.881$$

Applying the foregoing, a preferred range of values for A is 0.08 to 0.8, with a range of 0.1 to 0.2 permitting satisfactory performance.

The relative filtration rate $F_{rel}$ is defined as the ratio of permeation performance of a channel of a certain length to the maximum attainable performance at the same values of $R_k$ and $R_m$. It can also be expressed as a function of A and $A_{max}$:

$$F_{rel}(A) = \frac{(A_{max} + \sqrt{2}) \cdot \sinh(A)}{A \cdot \sinh(A) + \cosh(A)}$$

During adsorption, an ideal breakthrough curve of the target substance, i.e., one with spontaneous breakthrough, becomes distorted with increasing values of A according to the following relation, wherein v is the permeate volume divided by the volume required for complete loading of the adsorber with target substance and c is the concentration of target substance in the permeate divided by its initial concentration in the feed:

$$c(A, v) = \left[1 - (v \leq v_e(A)) \cdot \sqrt{\frac{1}{A^2 \cdot v^2} - \frac{1}{\sinh(A)^2}}\right]$$

In a preferred embodiment, the present invention comprises an apparatus that separates adsorptive material by permeation of liquids through porous adsorption membranes. This apparatus is characterized by the fact that a wound adsorber module forms a hollow cylinder with more than one winding of adsorption membranes, and that inner and outer annular gaps or plenums are formed between its inside surface and a cylindrical core and between its outside surface and an outer housing. In the case of hollow cylinders, the annular plenums are dimensioned so that the inner and outer annular plenums have the same volume. Using the Hagen-Poiseuille Law, for the outer annular plenum, the dimensionless resistance parameter A is:

$$A = L \cdot \sqrt{\frac{8 \cdot D \cdot d}{[(R_2+k)^2 - R_2^2] \cdot \left[(R_2+k)^2 + R_2^2 - \frac{(R_2+k)^2 - R_2^2}{\ln\left(\frac{R_2+k}{R_2}\right)}\right] \cdot \ln\left(\frac{R_2}{R_1}\right)}}$$

wherein:
$R_1$ = inside radius of the adsorber hollow cylinder in cm;
$R_2$ = outside radius of the adsorber hollow cylinder in cm;
k = width of the outer annular plenum in cm;
L = length of the adsorber hollow cylinder in cm;
D = flux through the individual membrane in cmcP/min·bar; and
d = thickness of the individual membrane in cm.

Exemplary calculations are set forth below, the calculations being for a hypothetical adsorber module based on practical numerical values of the aforementioned variants according to the invention (the example with only one winding illustrates the adverse effect of unduly narrow channels): L=100 cm $R_2$=48 mm k=2 mm D=150 cm$^3$/cm$^2$ min bar d=300 $\mu$m

| No. Windings | $R_1$ (mm) | A | $\Delta y_m$ | $v_b$ |
|---|---|---|---|---|
| 1 | 47.7 | 0.425 | 0.806 | 0.944 |
| 14 | 43.8 | 0.112 | 0.984 | 0.996 |
| 29 | 39.2 | 0.058 | 0.996 | 0.999 |
| 67 | 27.9 | 0.024 | 0.999 | 1 |

The foregoing calculations concern the dimensioning of a membrane adsorber module according to the invention for large design lengths, wherein modules with different numbers of windings can be accommodated in a common housing. The resistance parameters show that, theoretically, the adsorber length with 29 turns can be made 2 m long without adversely affecting flux or binding capacity. They also show that the length can be made 4 m long in the example module with 67 turns.

Applying the same channel dimensions to a module length of 10 cm, the values of A are reduced to a tenth of the values given in the above table, and the dead volume in each case is 123 mL. If the dimensions are adjusted for the same membrane surface area, so that the resistance parameters have roughly the value 0.1, the following reduced dead volumes are obtained without adversely affecting flux and binding capacity:

| No. Windings | $R_2$ (mm) | k (mm) | $R_1$ (mm) | A | dead volume (mL) |
|---|---|---|---|---|---|
| 1 | 48.8 | 1.2 | 48.5 | 0.092 | 74.5 |
| 13 | 49.6 | 0.45 | 45.5 | 0.108 | 28.1 |
| 28 | 49.6 | 0.35 | 41.2 | 0.106 | 21.9 |
| 63 | 49.7 | 0.3 | 30.7 | 0.083 | 18.8 |

Figure 1:
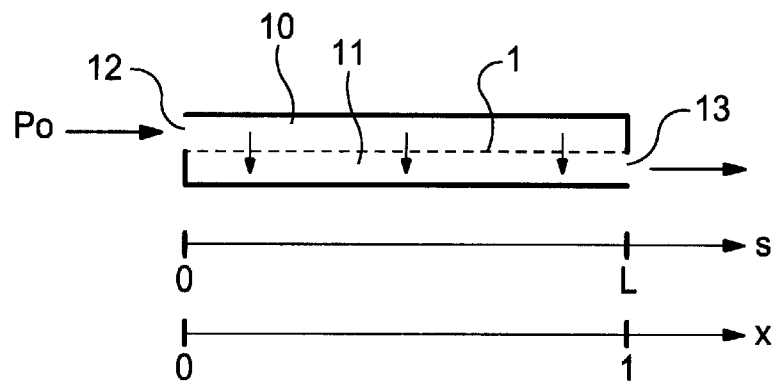
FIG. 1 is a schematic depicting the relationship between various structural elements of an adsorber module of the invention.

Turning to the drawings, the essential layout of an apparatus according to the invention is depicted in FIG. 1, the apparatus having at least one layer of a flat porous web material 1 that separates a tangential feed channel 10 for liquid from a tangential permeate channel 11, and wherein both tangential channels are closed on one end, while they also have an inlet 12 and an outlet 13 on the other opposite end. The flat porous web materials are preferably rectangular mats.

Figure 3:
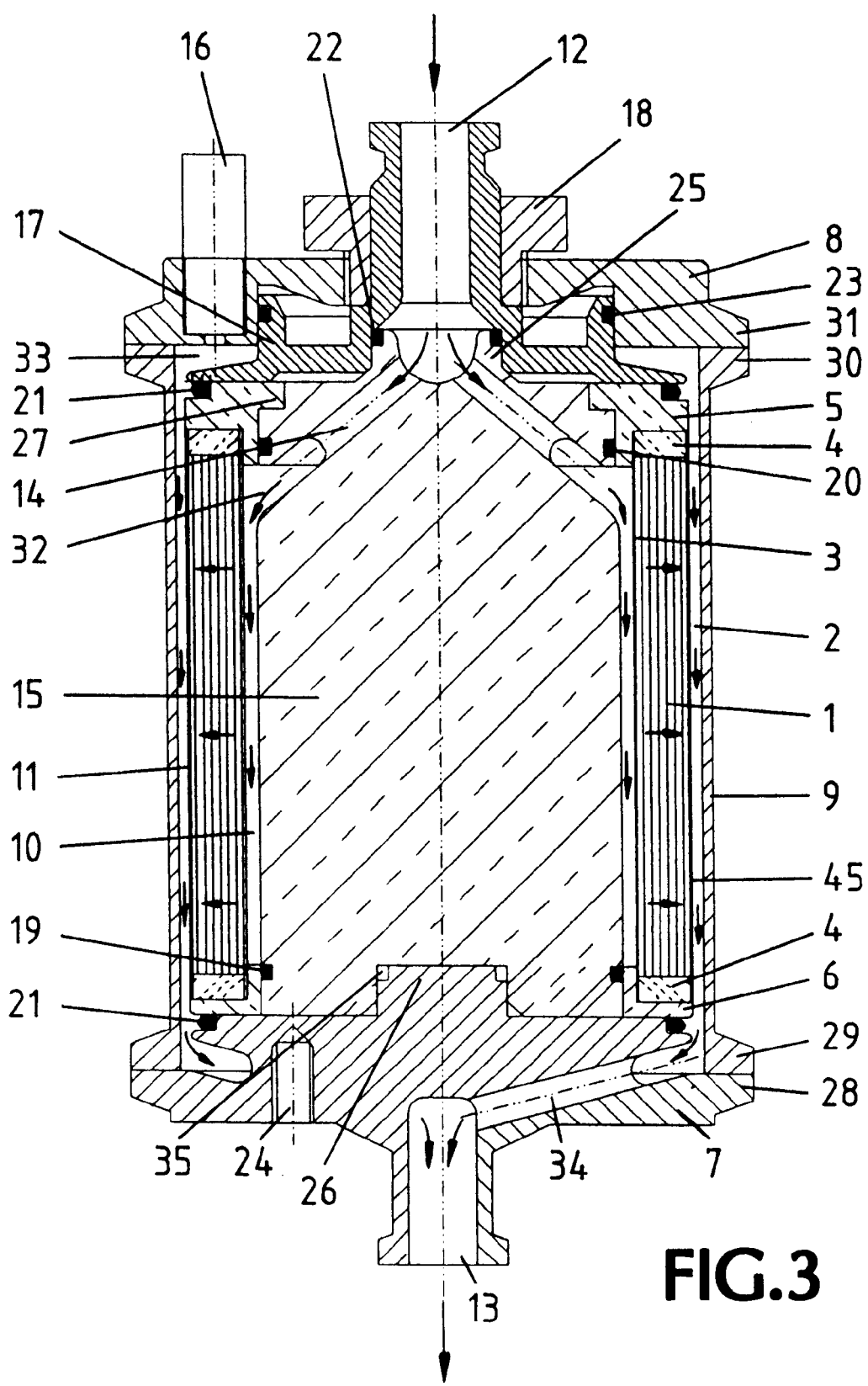
FIG. 3 is a cross-sectional drawing of an exemplary fluid treatment device of the present invention.
Figure 5:
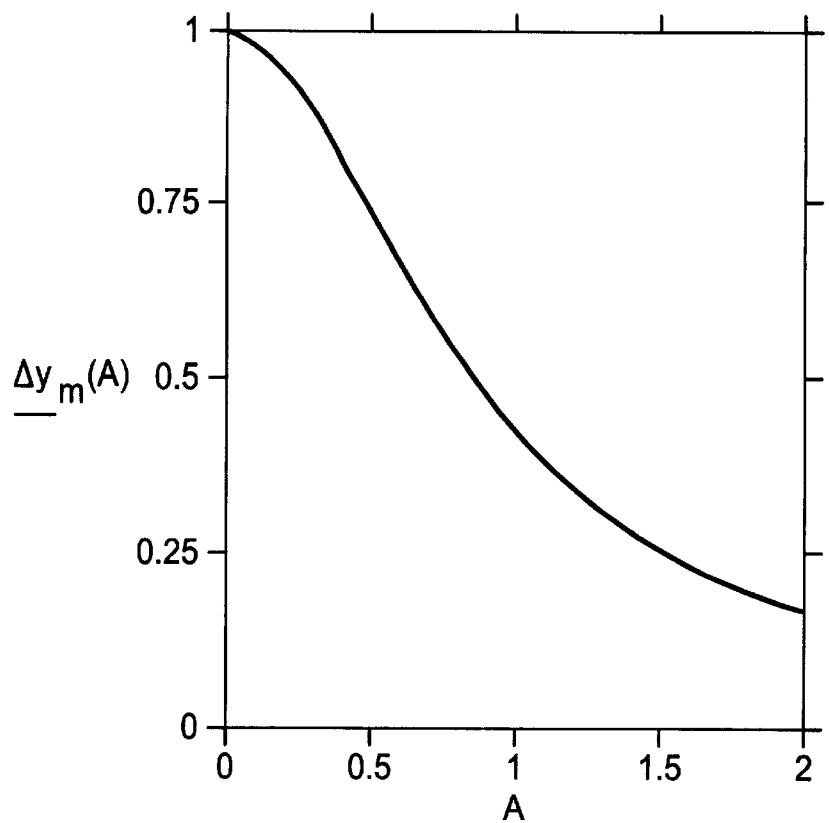
FIG. 5 is a graph of $\Delta y_m$, as a function of A.
Figure 6:
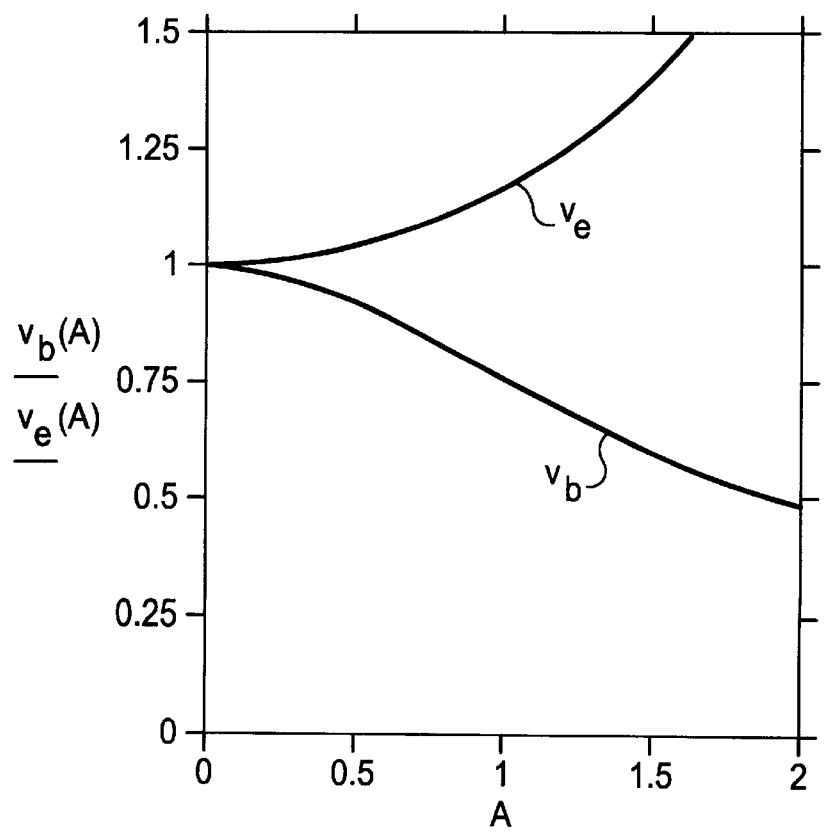
FIG. 6 is a graph showing the beginning ($v_b$) and end ($v_e$) of target substance breakthrough as a function of A.
Figure 7:
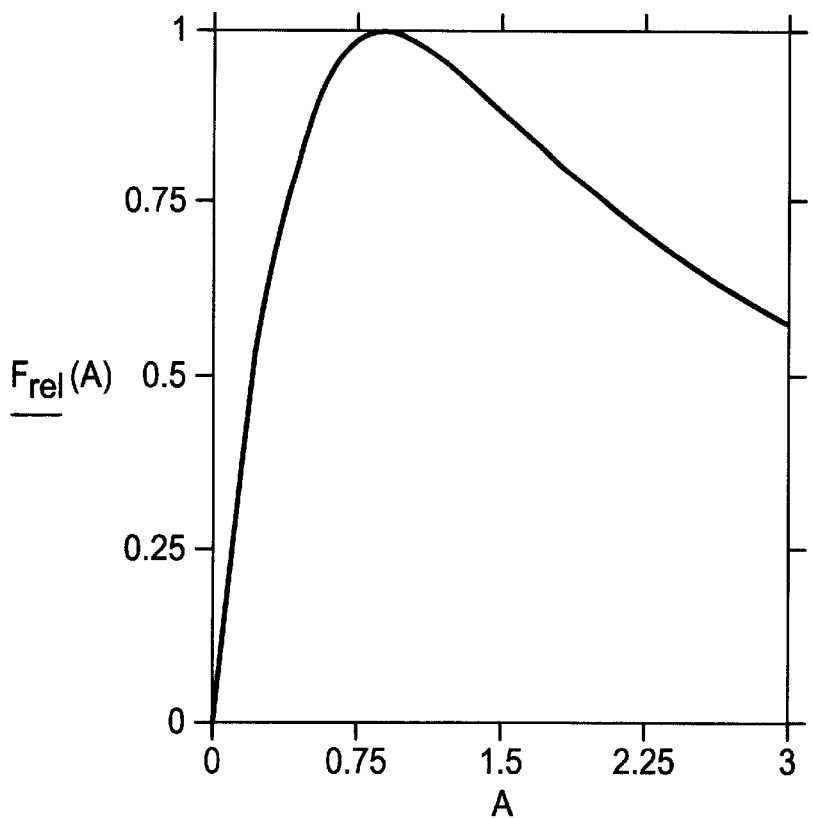
FIG. 7 is a graph of the relative filtration rate $F_{rel}$ as a function of A.
Figure 8:
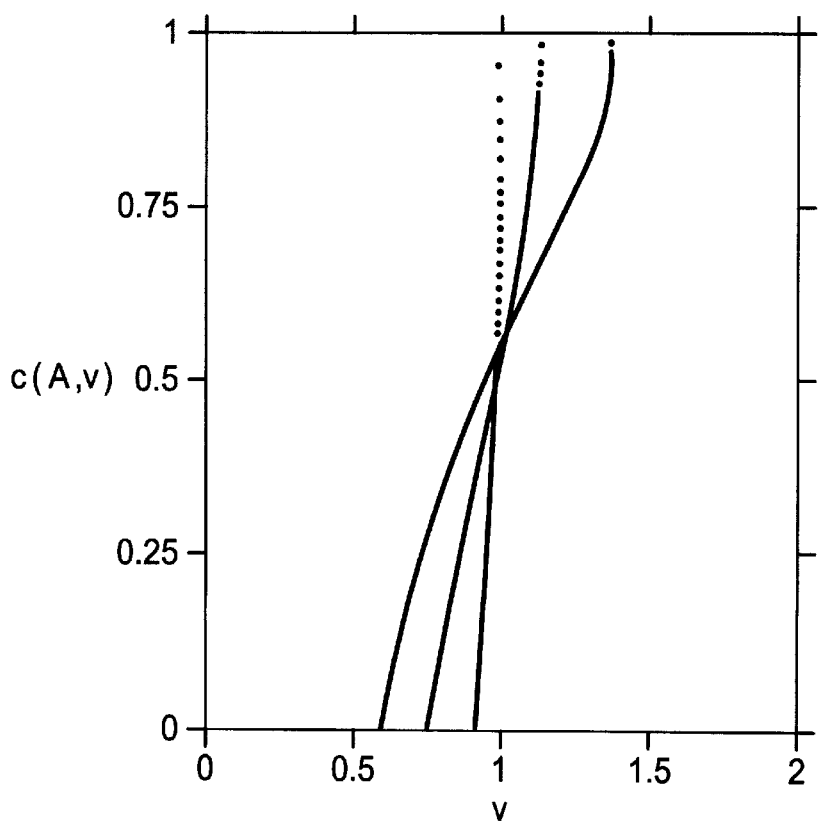
FIG. 8 is a graph of target substance breakthrough curves for various values of A and v.

FIG. 3 shows an exemplary preferred embodiment characterized by a wound adsorber module 45 forming a hollow cylinder comprising more than one winding of adsorption membranes 1, wherein inner and outer annular plenums 10 and 11 are formed between its inside surface and a cylindrical core 15 and between its outside surface and an outer housing 9. The annular plenums correspond to the tangential channels shown in FIG. 1.

The terms and expressions which have been employed in the forgoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for the treatment of liquids comprising:
(a) a housing having a liquid inlet and a liquid outlet that are separated from each other by porous web material;
(b) a tangential feed channel in said housing formed between said inlet and said porous web material and closed on one end;
(c) a tangential discharge channel formed between said outlet and said porous web material and closed on one end;
(d) said feed and discharge channels each containing a permeable support structure, and each having a channel length L, a width $b_k$ and a height $h_k$;
(e) said porous web material having a channel length L, a width $b_k$ and a predetermined height $h_m$; and
further characterized in that said channel length L has a value such that the dimensionless resistance parameter $A=L(R_k/2R_m)^{1/2}$ lies in a range from 0.08 to 0.8 wherein $R_k$ is the hydraulic channel resistance of said permeable support structure of width $b_k$, length s and height $h_k$ and is defined as $R_k=\Delta P_k b_k/Q_k s$;

$\Delta P_k$ is the pressure differential applied between the upstream and downstream sides of said permeable support structure;

$Q_k$ represents the amount of flowing liquid with a viscosity of 1 cP that flows per minute through the sample of said permeable support structure in its longitudinal direction;

$R_m$ is the hydraulic channel resistance of said porous web material of width $b_k$, length s and height $h_m$ and is defined as $R_m=\Delta P_m b_k s/Q_m$; and wherein $\Delta P_m$ is the pressure differential applied between the upstream and downstream sides of said porous web material; and $Q_m$ is the amount of flowing liquid with a viscosity of 1 cP that flows per minute through the sample of said porous web material in a direction perpendicular thereto.

2. The apparatus of claim 1 wherein L has a value such that said dimensionless resistance parameter A is from 0.1 to 0.2.

3. The apparatus of claim 1 wherein said feed and discharge channels have the same volume.

4. The apparatus of claim 1 wherein said porous web material comprises at least one layer of a flat web material.

5. A method for dimensioning an apparatus for the treatment of liquids wherein said apparatus comprises:
(a) a housing having a liquid inlet and a liquid outlet that are separated from each other by a porous web material;
(b) a tangential feed channel in said housing formed between said inlet and said porous web material and closed on one end;
(c) a tangential discharge channel formed between said outlet and said porous web material and closed on one end;
(d) said feed and discharge channels each containing a permeable support structure, and each having a channel length L, a width $b_k$ and a height $h_k$;
(e) said porous web material having a channel length L, a width $b_k$ and a predetermined height $h_m$; and
further characterized in that said channel length L has a value such that the dimensionless resistance parameter $A=L(R_k/2R_m)^{1/2}$ lies in a range from 0.08 to 0.8 wherein $R_k$ is the hydraulic channel resistance of said permeable support structure of width $b_k$, length s and height $h_k$ and is defined as $R_k=\Delta P_k b_k/Q_k s$ wherein $\Delta P_k$ is the pressure differential applied between the upstream and downstream sides of said permeable support structure;

$Q_k$ represents the amount of flowing liquid with a viscosity of 1 cP that flows per minute through the sample of said permeable support structure in its longitudinal direction;

$R_m$ is the hydraulic channel resistance of said porous web material of width $b_k$, length s and height $h_m$ and is defined as $R_m=\Delta P_m b_k s/Q_m$; and wherein $\Delta P_m$ is the pressure differential applied between the upstream and downstream sides of said porous web material; and $Q_m$ is the amount of flowing liquid with a viscosity of 1 cP that flows per minute through the sample of said porous web material in a direction perpendicular thereto; said method comprising the following steps:
(1) preparing a three-dimensional sample of said permeable support structure having a width $b_k$, a length s and a height $h_k$;
(2) measuring the amount of liquid $Q_k$ with a viscosity of 1 cP that flows per minute through said sample of said permeable support structure in its longitudinal direction when a pressure differential $\Delta P_k$ is applied between its downstream sides;
(3) calculating a hydraulic channel resistance $R_k$ of said support structure with the equation $R_k=\Delta P_k b_k/Q_k s$;
(4) preparing a three-dimensional sample of said porous web material having a width $b_k$, a length s and a height $h_m$;
(5) measuring the amount of liquid $Q_m$ with a viscosity of 1 cP that flows per minute through said sample of porous web material perpendicular thereto when a pressure differential $\Delta P_m$ is applied between its upstream and downstream sides;
(6) calculating a hydraulic channel resistance $R_m$ of said porous web material with the equation $R_m=\Delta P_m b_k s/Q_m$; and
(7) selecting the channel length L of said feed and discharge channels and of said porous web material, such that the dimensionless resistance parameter defined by $A=L(R_k/2R_m)^{1/2}$ lies in a range from 0.08 to 0.8.

6. The method of claim 5 wherein L is selected such that said dimensionless resistance parameter A is from 0.1 to 0.2.

* * * * *

UNITED STATES PATENT AND TRADEMARK OFFICE
CERTIFICATE OF CORRECTION

PATENT NO. : 6,257,416 B1
DATED : July 10, 2001
INVENTOR(S) : Dietmar Nussbaumer It is certified that error appears in the above-identified patent and that said Letters Patent is hereby corrected as shown below:

<u>Title page,</u>
Item [54], Title, delete "AND METHOD FOR DIMENSIONING DEVICE"

<u>Column 1,</u>
Line 7, delete "19711186.6" and insert -- 197 186.6 --

<u>Column 3,</u>
Line 30, change "bare•min/cm$^3$" to -- bar•min/cm$^3$ --

Signed and Sealed this

Twentieth Day of August, 2002

Attest:

*Attesting Officer*

JAMES E. ROGAN
*Director of the United States Patent and Trademark Office*